US010057351B2

(12) United States Patent
Baptist et al.

(10) Patent No.: US 10,057,351 B2
(45) Date of Patent: Aug. 21, 2018

(54) MODIFYING INFORMATION DISPERSAL ALGORITHM CONFIGURATIONS IN A DISPERSED STORAGE NETWORK

(71) Applicant: International Business Machines Corporation, Armonk, NY (US)

(72) Inventors: Andrew D. Baptist, Mt. Pleasant, WI (US); Asimuddin Kazi, Naperville, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/400,092

(22) Filed: Jan. 6, 2017

(65) Prior Publication Data
US 2017/0118288 A1 Apr. 27, 2017

Related U.S. Application Data

(63) Continuation-in-part of application No. 15/223,707, filed on Jul. 29, 2016, which is a continuation of (Continued)

(51) Int. Cl.
*G06F 12/00* (2006.01)
*H04L 29/08* (2006.01)
(Continued)

(52) U.S. Cl.
CPC .......... *H04L 67/1097* (2013.01); *G06F 3/067* (2013.01); *G06F 3/0619* (2013.01);
(Continued)

(58) Field of Classification Search
CPC ......... G06F 17/30575; G06F 17/30174; G06F 3/0619; G06F 3/0659; G06F 3/067; H04L 67/1097; H04L 67/34
See application file for complete search history.

(56) References Cited

U.S. PATENT DOCUMENTS 4,092,732 A   5/1978 Ouchi
5,454,101 A   9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Mark A Giardino, Jr.
(74) *Attorney, Agent, or Firm* — Garlick & Markison; Timothy W. Markison; Bruce E. Stuckman

(57) ABSTRACT

A method for execution by a dispersed storage (DS) client module includes receiving a write request for a first data object. A set of storage units associated with the first data object are identified, and an availability level is determined. The DS client module determines to modify dispersal parameters associated with the set based on the availability level, and modified dispersal parameters are determined based on current dispersal parameters and the availability level. Encoded slices are generated by performing an encoding function on the first data object using the modified dispersal parameters, and the slices are sent to the storage units. A second data object stored in the identified set of storage units is recovered by utilizing the current dispersal parameters. Encoded slices are generated by performing an encoding function on the second data object using the modified dispersal parameters, and the slices are sent to the storage units.

20 Claims, 6 Drawing Sheets

Related U.S. Application Data application No. 13/959,702, filed on Aug. 5, 2013, now Pat. No. 9,424,326.

(60) Provisional application No. 61/700,691, filed on Sep. 13, 2012.

(51) Int. Cl.
*G06F 3/06* (2006.01)
*G06F 17/30* (2006.01)
*G06F 13/00* (2006.01)
*G06F 13/28* (2006.01)

(52) U.S. Cl.
CPC ...... *G06F 3/0659* (2013.01); *G06F 17/30174* (2013.01); *G06F 17/30575* (2013.01); *H04L 67/34* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,055,120 | A * | 4/2000 | Schirle ............... G11B 19/20 360/71 |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,457,065 | B1 | 9/2002 | Rich et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,467,265 | B1 | 12/2008 | Tawri et al. |
| 7,636,724 | B2 | 12/2009 | de la Torre et al. |
| 8,676,851 | B1 | 3/2014 | Nesbit et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0161754 | A1* | 6/2011 | Baptist ............... G06F 11/1092 714/718 |
| 2012/0137095 | A1* | 5/2012 | Grube ............... G06F 12/00 711/162 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

(56) References Cited

OTHER PUBLICATIONS

Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

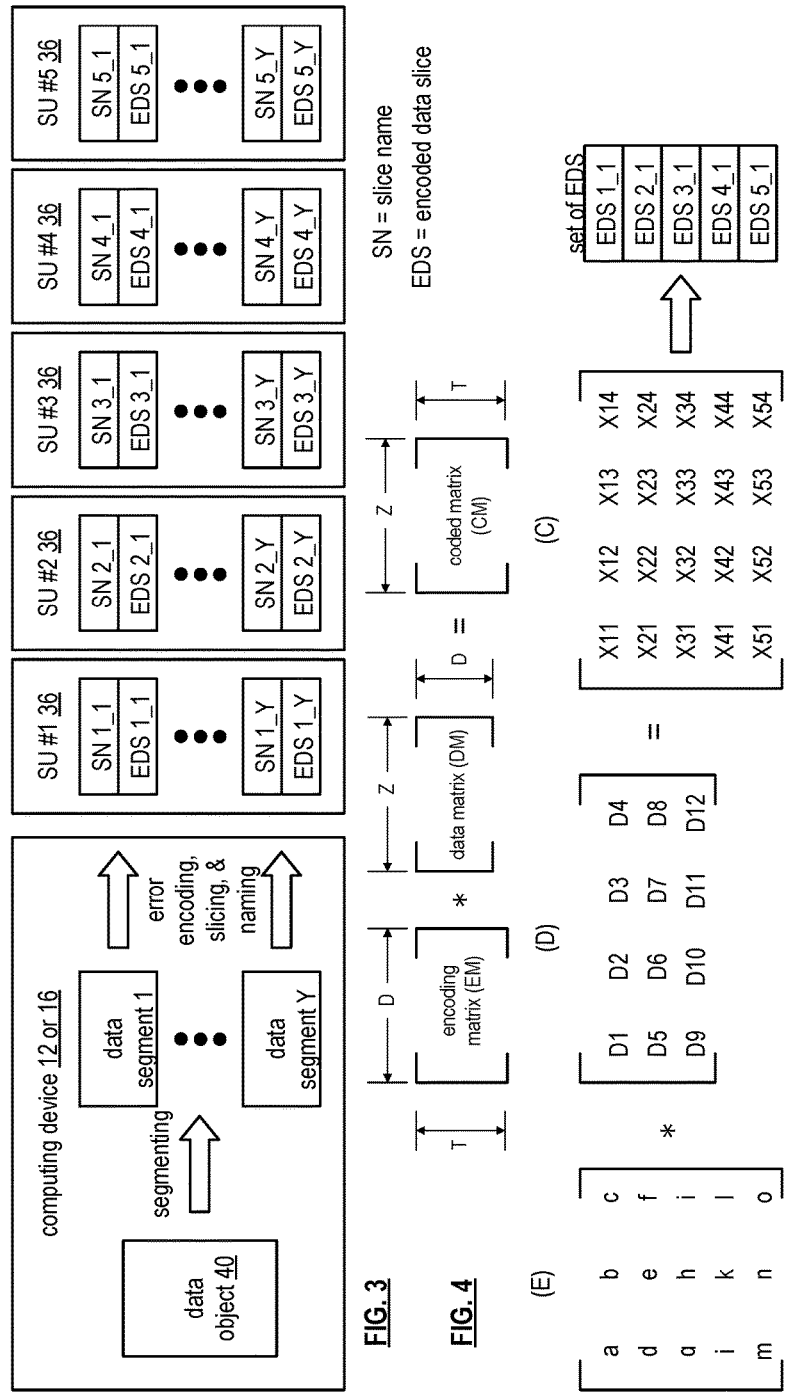

US 10,057,351 B2

MODIFYING INFORMATION DISPERSAL ALGORITHM CONFIGURATIONS IN A DISPERSED STORAGE NETWORK

CROSS-REFERENCE TO RELATED APPLICATIONS

The present U.S. Utility Patent Application claims priority pursuant to 35 U.S.C. § 120 as a continuation-in-part of U.S. Utility application Ser. No. 15/223,707, entitled "AVOIDING WRITE CONFLICTS IN A DISPERSED STORAGE NETWORK", filed Jul. 29, 2016, which is a continuation of U.S. Utility application Ser. No. 13/959,702, entitled "WRITING DATA AVOIDING WRITE CONFLICTS IN A DISPERSED STORAGE NETWORK", filed Aug. 5, 2013, issued as U.S. Pat. No. 9,424,326 on Aug. 23, 2016, which claims priority pursuant to 35 U.S.C. § 119(e) to U.S. Provisional Application No. 61/700,691, entitled "UPDATING A DISPERSED STORAGE AND TASK NETWORK INDEX", filed Sep. 13, 2012, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
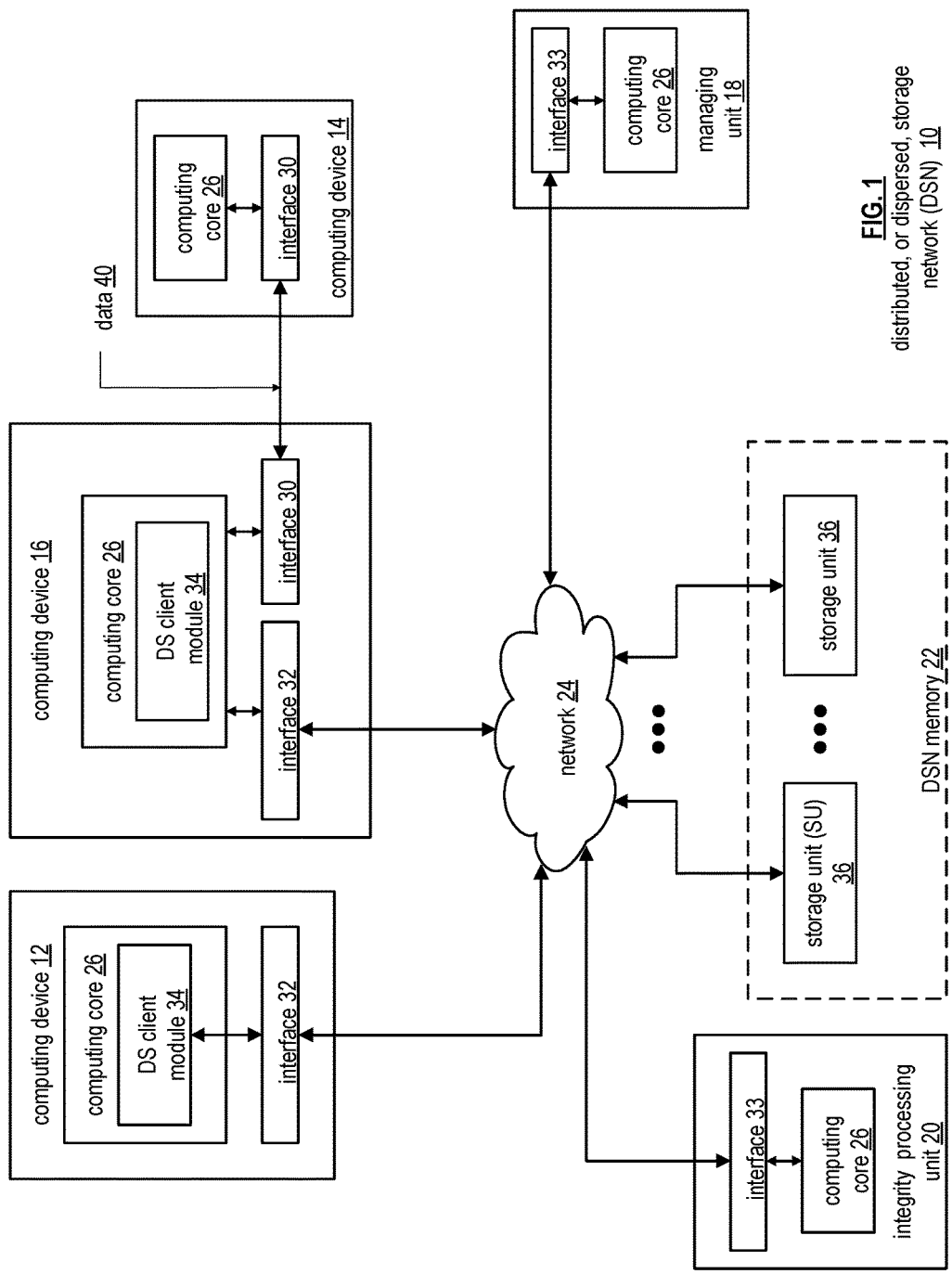
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
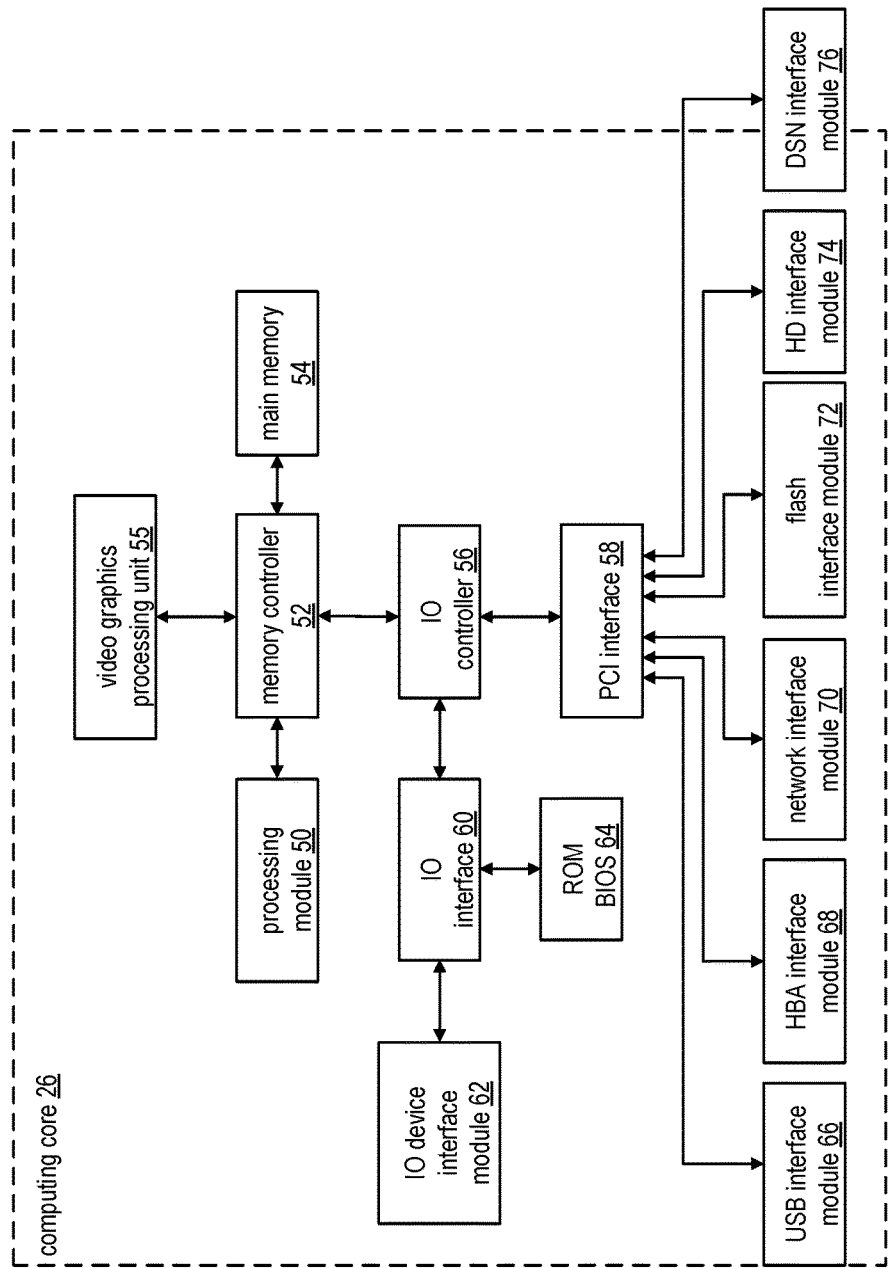
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
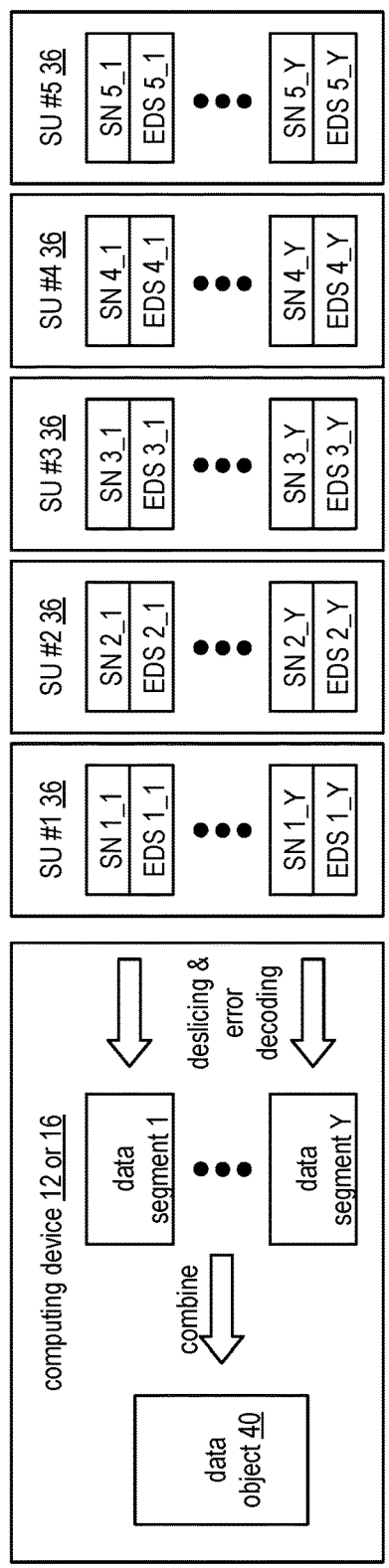
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
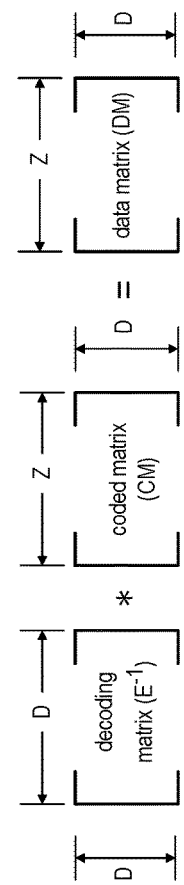
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
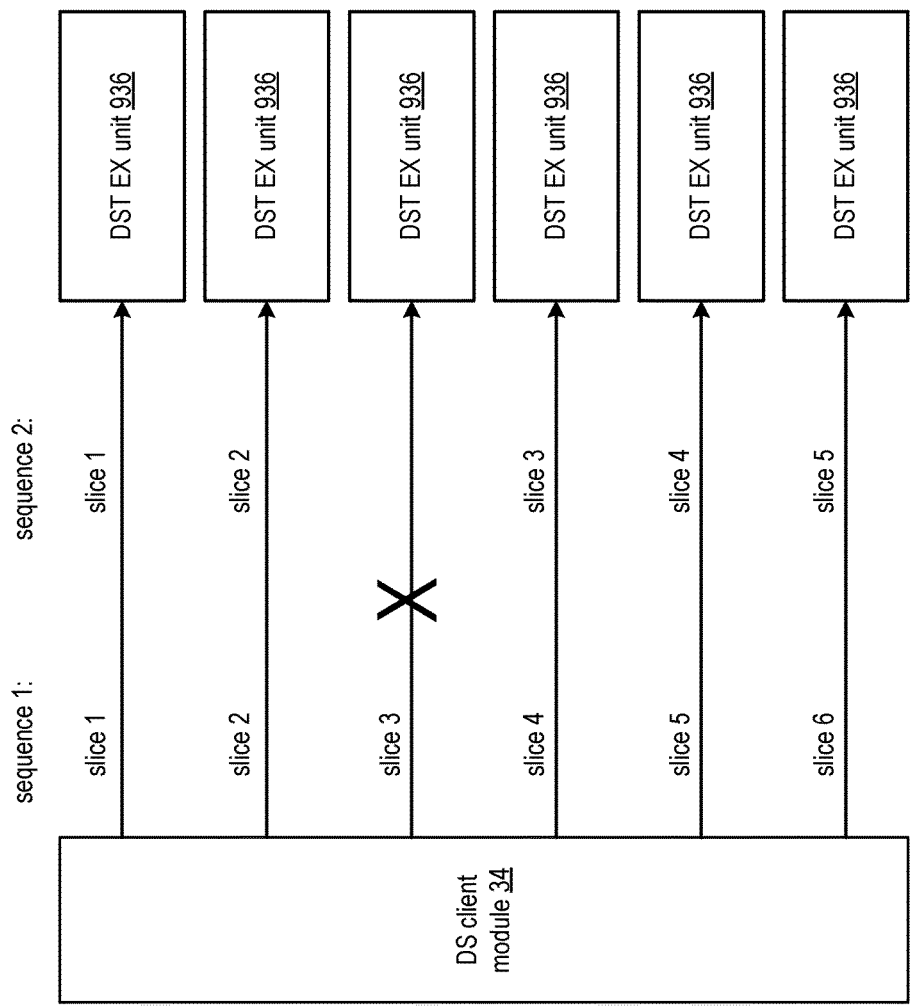
FIG. 9 is a schematic block diagram of an embodiment of a dispersed or distributed storage network (DSN) in accordance with the present invention.

FIG. 9 is a schematic block diagram of another embodiment of a distributed computing system that includes a dispersed storage (DS) client module 34 and a plurality of DST execution units 936. Each DST execution unit 936 can be implemented utilizing the storage unit 36 of FIG. 1, utilized as distributed storage and task (DST) execution unit as described previously. Storage units can hereafter be interchangeably referred to as DST execution (EX) units. The DSN functions to modify information dispersal algorithm (IDA) configurations.

A DSN memory can be configured with at least one IDA configuration, which consists of a read threshold, a write threshold, and a width. Based on an available width, a DS client module of a computing device or of another DSN component can select from among the set of IDA configurations to use the one that offers the best of reliability, performance, and/or storage efficiency. When width changes, in a site outage, node outage, changing network condition, or other such instance, the DS client module may re-evaluate its IDA configuration of choice to use for writing new data. For example, a system that is initially 10-of-16, after a site failure, the maximum width may fall to 12. At this point, the computing device may switch to using a 7-of-12 IDA configuration. (Which may be preferable to writing in a 10-of-12 after the site outage).

In an example of operation, the system stores data segments as sets of encoded data slices 1-6 in the plurality of DST execution units 936. The DS client module 34 encodes each data segment using a dispersed storage error coding function to produce a set of encoded data slices in accordance with dispersal parameters. The dispersal parameters can include a pillar width and a decode threshold, such as the pillar width T and decode threshold number D discussed previously. The DS client module 34 may determine the dispersal parameters based on storage conditions. The storage conditions include one or more of current dispersal parameters, a reliability goal, an availability goal, a performance goal, an actual reliability level, an actual availability level, an actual performance goal, and estimates of one or more of reliability, availability, and performance. For example, the DS client module 34 determines the dispersal parameters to include a pillar width of six when six DST execution units 936 of the plurality of DST execution units 936 are associated with favorable availability. As another example, the DS client module 34 determines the dispersal parameters to include a decode threshold of four in accordance with an estimated reliability level when the pillar width is six.

The determining of the dispersal parameters may be dynamic as a function of changes of the storage conditions. For example, the DS client module 34 determines the dispersal parameters to include pillar width of five when one of the previously available six DST execution units 936 becomes unavailable. As another example, the DS client module 34 determines to update the decode threshold to three in accordance with an estimated reliability level when the pillar width is five. In addition, the DS client module 34 may retrieve at least one previously stored data segment utilizing a previous set of dispersal parameters to reproduce the data segment for re-encoding utilizing the dispersal parameters for re-storage in an updated pillar width number of the plurality of DST execution units 936.

In various embodiments, a processing system of a DS client module includes at least one processor and a memory that stores operational instructions, that when executed by the at least one processor cause the processing system to receive a write request to store a first data object. A set of storage units associated with the first data object are identified, and an availability level of the identified set of storage units is determined. The DS client module determines to modify dispersal parameters associated with the set of storage units based on the availability level of the set of storage units, and modified dispersal parameters are determined based on current dispersal parameters and the availability level of the set of storage units. A first plurality of sets of encoded data slices is generated by performing an encoding function on the first data object using the modified dispersal parameters, and the plurality of sets of encoded data slices are sent to the identified set of storage units. A second data object stored in the identified set of storage units is recovered by utilizing the current dispersal parameters. A second plurality of sets of encoded data slices are generated by performing an encoding function on the second data object using the modified dispersal parameters, and the second plurality of sets of encoded data slices are sent to the identified set of storage units.

In various embodiments, identifying the set of storage units includes identifying a vault based on an identifier of a requesting entity by a registry lookup, wherein the set of storage units is identified based on identifier of the vault based on a registry lookup. In various embodiments, the availability level is based on at least one of: a number of storage units of the identified set of storage units that are operational. In various embodiments, determining the availability level is based on at least one of: initiating a test, initiating a query, receiving a response, or performing a lookup. In various embodiments, the DS client module determines to modify dispersal parameters in response to determining that the availability level of the set of storage units compares unfavorably to an availability level threshold.

In various embodiments, determining the modified dispersal parameters includes at least one of: changing a pillar width of the current dispersal parameters or changing a decode threshold of the current dispersal parameters. In various embodiments, determining the modified dispersal parameters includes calculating an estimated reliability level corresponding to the modified dispersal parameters and determining that the estimated reliability level compares favorably to a reliability level threshold. In various embodiments, determining the modified dispersal parameters includes increasing a pillar width of the current dispersal parameters in response to determining that the availability level has increased from a previous availability level. In various embodiments, determining the modified dispersal parameters includes decreasing a pillar width of the current dispersal parameters in response to determining that the availability level has decreased from a previous availability level. In various embodiments, the pillar width is decreased in response to determining that at least one storage unit of the set of storage units has become unavailable.

Figure 10:
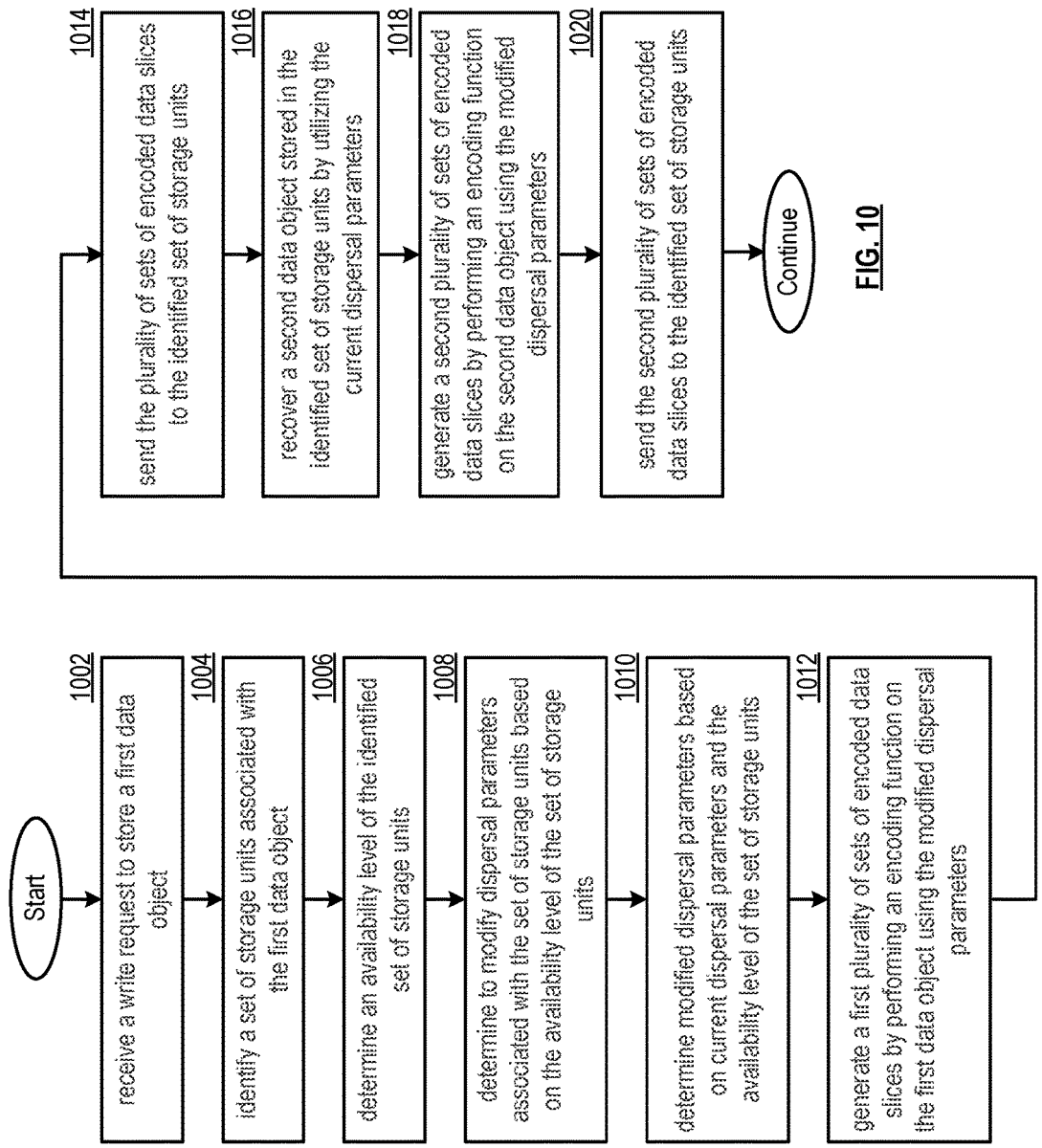
FIG. 10 is a logic diagram of an example of a method of modifying information dispersal algorithm configurations in accordance with the present invention.

FIG. 10 is a flowchart illustrating an example of modifying information dispersal algorithm configurations. In particular, a method is presented for use in association with one or more functions and features described in conjunction with FIGS. 1-9, for execution by a dispersed storage (DS) client module that includes a processor or via another processing system of a dispersed storage network that includes at least one processor and memory that stores instruction that configure the processor or processors to perform the steps described below.

The method begins at step 1002, which includes receiving a write request to store a first data object. The method continues at step 1004, which includes identifying a set of storage units associated with the first data object (e.g., identify a vault based on an identifier of a requesting entity by a registry lookup, identify the storage set based on the vault ID by a lookup by a registry lookup). The method continues at step 1006, which includes determining an availability level of the identified set of storage units. The availability level can include at least one of how many DST execution units of the DST execution unit storage set are not operational and which DST execution units of the storage set are operational. The determining may be based on one or more of initiating a test, initiating a query, receiving a response, and performing a lookup.

The method continues at step 1008, which includes determining whether to modify dispersal parameters associated with the set of storage units based on the availability level of the set of storage units based on storage conditions including the availability level of the DST execution unit storage set. For example, the DS client module determines to modify dispersal parameters when the availability level of the DST execution unit storage set is less than an availability level threshold. When modifying the dispersal parameters, the method continues at step 1010, which includes determining modified dispersal parameters based on current dispersal parameters and the availability level of the set of storage units. The DS client module determines modified dispersal parameters based on the dispersal parameters and the storage conditions including the availability level of the DST execution unit storage set. For example, the DS client module determines modified dispersal parameters to include a pillar width of six when the dispersal parameters include a pillar width of five and the availability level of the DST execution unit storage set indicates that six DST execution units are now available. As another example, the DS client module determines the modified dispersal parameters to include a decode threshold of four when the dispersal parameters includes a decode threshold of three and an estimated reliability level of the DST execution unit storage set that includes six DST execution units compares favorably with a reliability level threshold when utilizing the decode threshold four.

The method continues at step 1012, which includes generating a first plurality of sets of encoded data slices by performing an encoding function on the first data object using the modified dispersal parameters. The method continues at step 1014, which includes sending the plurality of sets of encoded data slices to the identified set of storage units, which can include all of the storage units in the set, or a subset of the storage units in the set (e.g., to available units). The method continues at step 1016, which includes recovering a second data object stored in the identified set of storage units by utilizing the current dispersal parameters. The recovering includes retrieving slices from available DST execution units and decoding the retrieved slices using the dispersal parameters to reproduce the other data. The method continues at step 1018, which generating a second plurality of sets of encoded data slices by performing an encoding function on the second data object using the modified dispersal parameters. The method continues at step 1020, which includes sending the second plurality of sets of encoded data slices to the identified set of storage units, which can include all of the storage units in the set, or a subset of the storage units in the set (e.g., to available units).

In various embodiments, a non-transitory computer readable storage medium includes at least one memory section that stores operational instructions that, when executed by a processing system of a dispersed storage network (DSN) that includes a processor and a memory, causes the processing system to receive a write request to store a first data object. A set of storage units associated with the first data object are identified, and an availability level of the identified set of storage units is determined. The DS client module determines to modify dispersal parameters associated with the set of storage units based on the availability level of the set of storage units, and modified dispersal parameters are determined based on current dispersal parameters and the availability level of the set of storage units. A first plurality of sets of encoded data slices is generated by performing an encoding function on the first data object using the modified dispersal parameters, and the plurality of sets of encoded data slices are sent to the identified set of storage units. A second data object stored in the identified set of storage units is recovered by utilizing the current dispersal parameters. A second plurality of sets of encoded data slices are generated by performing an encoding function on the second data object using the modified dispersal parameters, and the second plurality of sets of encoded data slices are sent to the identified set of storage units.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a distributed storage (DS) client module that includes a processor, the method comprises:
   receiving a write request to store a first data object;
   identifying a set of storage units associated with the first data object;
   determining an availability level of the identified set of storage units;
   determining to modify dispersal parameters associated with the set of storage units based on the availability level of the set of storage units;
   determining modified dispersal parameters based on current dispersal parameters and the availability level of the set of storage units;
   generating a first plurality of sets of encoded data slices by performing an encoding function on the first data object using the modified dispersal parameters;
   sending the plurality of sets of encoded data slices to the identified set of storage units;
   recovering a second data object stored in the identified set of storage units by utilizing the current dispersal parameters;
   generating a second plurality of sets of encoded data slices by performing an encoding function on the second data object using the modified dispersal parameters; and
   sending the second plurality of sets of encoded data slices to the identified set of storage units.

2. The method of claim 1, wherein identifying the set of storage units includes identifying a vault based on an identifier of a requesting entity by a registry lookup, wherein the set of storage units is identified based on identifier of the vault based on a registry lookup.

3. The method of claim 1, wherein the availability level is based on at least one of: a number of storage units of the identified set of storage units that are operational.

4. The method of claim 1, wherein determining the availability level is based on at least one of: initiating a test, initiating a query, receiving a response, or performing a lookup.

5. The method of claim 1, wherein the DS client module determines to modify dispersal parameters in response to determining that the availability level of the set of storage units compares unfavorably to an availability level threshold.

6. The method of claim 1, wherein determining the modified dispersal parameters includes at least one of: changing a pillar width of the current dispersal parameters or changing a decode threshold of the current dispersal parameters.

7. The method of claim 1, wherein determining the modified dispersal parameters includes calculating an estimated reliability level corresponding to the modified dispersal parameters and determining that the estimated reliability level compares favorably to a reliability level threshold.

8. The method of claim 1, wherein determining the modified dispersal parameters includes increasing a pillar width of the current dispersal parameters in response to determining that the availability level has increased from a previous availability level.

9. The method of claim 1, wherein determining the modified dispersal parameters includes decreasing a pillar width of the current dispersal parameters in response to determining that the availability level has decreased from a previous availability level.

10. The method of claim 9, wherein the pillar width is decreased in response to determining that at least one storage unit of the set of storage units has become unavailable.

11. A processing system of a dispersed storage (DS) client module comprises:
    at least one processor;
    a memory that stores operational instructions, that when executed by the at least one processor cause the processing system to:
    receive a write request to store a first data object;
    identify a set of storage units associated with the first data object;
    determine an availability level of the identified set of storage units;
    determine to modify dispersal parameters associated with the set of storage units based on the availability level of the set of storage units;
    determine modified dispersal parameters based on current dispersal parameters and the availability level of the set of storage units;
    generate a first plurality of sets of encoded data slices by performing an encoding function on the first data object using the modified dispersal parameters;
    send the plurality of sets of encoded data slices to the identified set of storage units;
    recover a second data object stored in the identified set of storage units by utilizing the current dispersal parameters;
    generate a second plurality of sets of encoded data slices by performing an encoding function on the second data object using the modified dispersal parameters; and
    send the second plurality of sets of encoded data slices to the identified set of storage units.

12. The processing system of claim 11, wherein identifying the set of storage units includes identifying a vault based on an identifier of a requesting entity by a registry lookup, wherein the set of storage units is identified based on identifier of the vault based on a registry lookup.

13. The processing system of claim 11, wherein the availability level is based on at least one of: a number of storage units of the identified set of storage units that are operational.

14. The processing system of claim 11, wherein the DS client module determines to modify dispersal parameters in response to determining that the availability level of the set of storage units compares unfavorably to an availability level threshold.

15. The processing system of claim 11, wherein determining the modified dispersal parameters includes at least one of: changing a pillar width of the current dispersal parameters or changing a decode threshold of the current dispersal parameters.

16. The processing system of claim 11, wherein determining the modified dispersal parameters includes calculating an estimated reliability level corresponding to the modified dispersal parameters and determining that the estimated reliability level compares favorably to a reliability level threshold.

17. The processing system of claim 11, wherein determining the modified dispersal parameters includes increasing a pillar width of the current dispersal parameters in response to determining that the availability level has increased from a previous availability level.

18. The processing system of claim 11, wherein determining the modified dispersal parameters includes decreasing a pillar width of the current dispersal parameters in response to determining that the availability level has decreased from a previous availability level.

19. The processing system of claim 18, wherein the pillar width is decreased in response to determining that at least one storage unit of the set of storage units has become unavailable.

20. A non-transitory computer readable storage medium comprises:
   at least one memory section that stores operational instructions that, when executed by a processing system of a dispersed storage network (DSN) that includes a processor and a memory, causes the processing system to:
   receive a write request to store a first data object;
   identify a set of storage units associated with the first data object;
   determine an availability level of the identified set of storage units;
   determine to modify dispersal parameters associated with the set of storage units based on the availability level of the set of storage units;
   determine modified dispersal parameters based on current dispersal parameters and the availability level of the set of storage units;
   generate a first plurality of sets of encoded data slices by performing an encoding function on the first data object using the modified dispersal parameters;
   send the plurality of sets of encoded data slices to the identified set of storage units;
   recover a second data object stored in the identified set of storage units by utilizing the current dispersal parameters;
   generate a second plurality of sets of encoded data slices by performing an encoding function on the second data object using the modified dispersal parameters; and
   send the second plurality of sets of encoded data slices to the identified set of storage units.

* * * * *